United States Patent [19]
Häfner et al.

[11] 4,126,111
[45] Nov. 21, 1978

[54] OTTO INTERNAL COMBUSTION ENGINE

[75] Inventors: Günther Häfner; Victor Pfeffer, both of Stuttgart, Germany

[73] Assignee: Daimler-Benz Aktiengesellschaft, Germany

[21] Appl. No.: 730,441

[22] Filed: Oct. 7, 1976

[30] Foreign Application Priority Data

Oct. 8, 1975 [DE] Fed. Rep. of Germany ....... 2544996

[51] Int. Cl.² ............................................. F02M 31/00
[52] U.S. Cl. ................................. 123/122 E; 123/133; 165/105
[58] Field of Search ........................... 165/105, 51, 52; 123/122 AA, 122 R, 122 E, 133

[56] References Cited
U.S. PATENT DOCUMENTS

| | | | |
|---|---|---|---|
| 3,927,651 | 12/1975 | Harrow et al. | 123/122 E |
| 3,935,849 | 2/1976 | Mills | 123/122 AA |
| 3,937,024 | 5/1976 | Mills | 123/122 E |
| 3,939,813 | 2/1976 | Harrow | 123/122 E |
| 3,965,681 | 6/1976 | Wyczalek | 123/122 AA |
| 3,986,665 | 10/1976 | Kofink | 165/105 |
| 3,987,773 | 10/1976 | Harrow et al. | 123/122 AA |

Primary Examiner—Ronald H. Lazarus
Attorney, Agent, or Firm—Craig & Antonelli

[57] ABSTRACT

An Otto internal combustion engine with a high-pressure metering system and with evaporation of the fuel that is heated electrically and/or by means of exhaust gas heat, by way of at least one expansion nozzle; the fuel in the operating phase of the engine is thereby adapted to be heated by means of exhaust gas heat at most to a base temperature lying below the desired design temperature to which the fuel is intended to be heated, and is adapted to be electrically heated from the base temperature to the desired temperature.

20 Claims, 5 Drawing Figures

OTTO INTERNAL COMBUSTION ENGINE

The present invention relates to an Otto internal combustion engine, especially for motor vehicles, with a high-pressure metering system and evaporation of the fuel that is heated electrically and/or by way of exhaust gas heat, by way of at least one expansion nozzle.

It has already been proposed for such an Otto internal combustion engine to undertake with direct or indirect heating an electrical heating for the starting phase and a heating by way of the exhaust gases for the operating phase. However, such an exclusive heating of the fuel by way of the exhaust gas heat during the operating phase leads to considerable difficulties. This is so as the fuel, independent of the respective load of the engine, has to be heated always to the same temperature. This temperature, which lies near the decomposition or dissociation temperature of the fuel, must be kept thereby within narrow limits because exceeding this temperature, in addition to the decomposition of the fuel, also leads to damage of the heat-exchanger system. Dropping below this temperature must also be avoided because otherwise the evaporation will be impaired nonpermissively. The evaporation forms, however, an intermediate step in the fuel preparation process, which is intended to lead in its end effect to a finely dispersed fuel mist. Such a finely dispersed fuel mist is aimed at in order to achieve a uniform mixture distribution to the individual cylinders which distribution otherwise is impaired by the separation of the fuel droplets present in the mixture at the walls of the suction lines. Furthermore, the attainment of a finely dispersed mist is essential for the mixture during partial load as regards the leaning ability of the mixture.

In order to be able to maintain with an Otto internal combustion engine of the aforementioned type the aimed-at high fuel temperature independently of the load condition at which the engine is operated with the required accuracy, it is proposed according to the present invention that the fuel in the operating phase of the engine is adapted to be heated by way of exhaust gas heat at most to a base temperature lying below its desired or intended heated temperature and is adapted to be electrically heated from the base temperature to the intended or desired temperature. As a result of such an arrangement, on the one hand, temperature fluctuations can be avoided for those cases in which the respectively seized exhaust gas heat does not suffice for the heating of the fuel, as this may be the case, for example, in the lower partial load range, and the attainment of the desired or intended temperature can be assured. On the other hand, also the fluctuations caused by the inertia of the exhaust gas heat supply in the upward direction, i.e., up to near the desired temperature become tolerable because the electrical energy supply is controllable rapidly and finely without difficulties. The difference between the base temperature and the desired temperature is thereby kept as small as possible.

For purposes of transferring the exhaust gas heat to the fuel, a heat pipe has proved as appropriate within the scope of the present invention, whose heat carrier has a boiling temperature corresponding approximately to the base temperature.

In order to avoid an overheating of the fuel after shutting off the internal combustion engine, as might result by reason of the transfer of the heat still stored in the exhaust gas heat transfer system onto the no longer flowing fuel, according to a further feature of the present invention, a latent heat accumulator or storage device may be coordinated to the heat pipe in its condenser part. Heat can be continued to be removed from the latent heat storage device for the heating of the fuel when an energy deficit occurs for a short period of time on the exhaust gas side, for example, in the lower partial load range or when the engine, after a relatively short operating pause, is again set into operation. In both cases, a saving of heat energy to be otherwise supplied electrically will result thereby from the use of the latent heat storage device.

If according to a further feature of the present invention a cooling water heat-exchanger is coordinated to the heat pipe in its condenser portion, then excess heat energy which possibly also could not be absorbed by way of the latent heat storage device can be removed by way of the cooling water heat exchanger. Appropriately, with such constructions in accordance with the present invention, the latent heat storage device and/or the cooling water heat-exchanger are adapted to be selectively interconnected. Such an interconnectability can be achieved within the scope of the present invention in a particularly simple manner by the partial filling of the heat pipe with an inert gas essentially not participating in the heat transport or conveyance, in which the inert gas volume is dependent on the vapor pressure of the heat carrier and in which the size of the effective condenser surface of the heat pipe is controlled as a function of temperature by way of the change in volume. Thus, a temperature-dependent selective connection of the cooling water heat exchanger and/or of the latent heat storage device can be achieved in this manner. A temperature-dependent connection can also be achieved for both independently of the aforementioned solution by the use of thermal switch elements so that possibly in a system for a latent heat storage device and a cooling water heat-exchanger, also different connecting and disconnecting possibilities exist. If the latent heat storage device is thereby connected, i.e., turned on and rendered operable, by way of a thermal switch element, then the latent heat storage device is appropriately arranged between the fuel heat-exchanger and the exhaust gas heat-exchanger.

The electrical heating can be realized in a particularly simple manner by the use of a cold conductor constructed as heat-exchanger which, for example, may consist of barium titanate ($BaTiO_3$), because the disengagement or disconnection of the electrical heating takes place automatically by reason of the physical properties of the cold conductor. Local overheatings and decompositions are avoided thereby with certainty since the cold conductor represents itself the heat-exchanger and the current supply is far-reachingly interrupted also partially by strong temperature-dependent resistance changes. With a view toward the heat-exchanger function, according to the present invention as large as possible a cold conductor area is aimed at, which is achieved, for example, especially by porous structure of the cold conductor material which may be constructed as porous matrix of any known suitable material or of stacked plates consisting of densely-sintered, cold-conductor material of conventional type.

Accordingly, it is an object of the present invention to provide an Otto internal combustion engine which avoids by simple means the aforementioned shortcomings and drawbacks encountered in the prior art.

Another object of the present invention resides in an Otto internal combustion engine which is characterized by greatly improved heating of the fuel.

A further object of the present invention resides in an Otto internal combustion engine in which the fuel is always heated to substantially the same temperature without difficulties and without complicated controls.

A still further object of the present invention resides in an Otto internal combustion engine in which the fuel temperature is kept within relatively narrow limits under all operating conditions of the engine.

A further object of the present invention resides in a heating system for heating the fuel in such a manner that a finely dispersed fuel mist is attainable, resulting in uniform mixture distribution to the individual cylinders.

Still a further object of the present invention resides in a heating system for the fuel of Otto internal combustion engines which substantially minimizes fluctuations in the temperature thereof, yet avoids an overheating of the fuel after the shutting down of the engine.

Another object of the present invention resides in a heating system for heating the fuel of Otto internal combustion engines which excels by high efficiency of the system.

These and other objects, features and advantages of the present invention will become more apparent from the following description when taken in connection with the accompanying drawing which shows, for purposes of illustration only, several embodiments in accordance with the present invention, and wherein.

Figure 1:
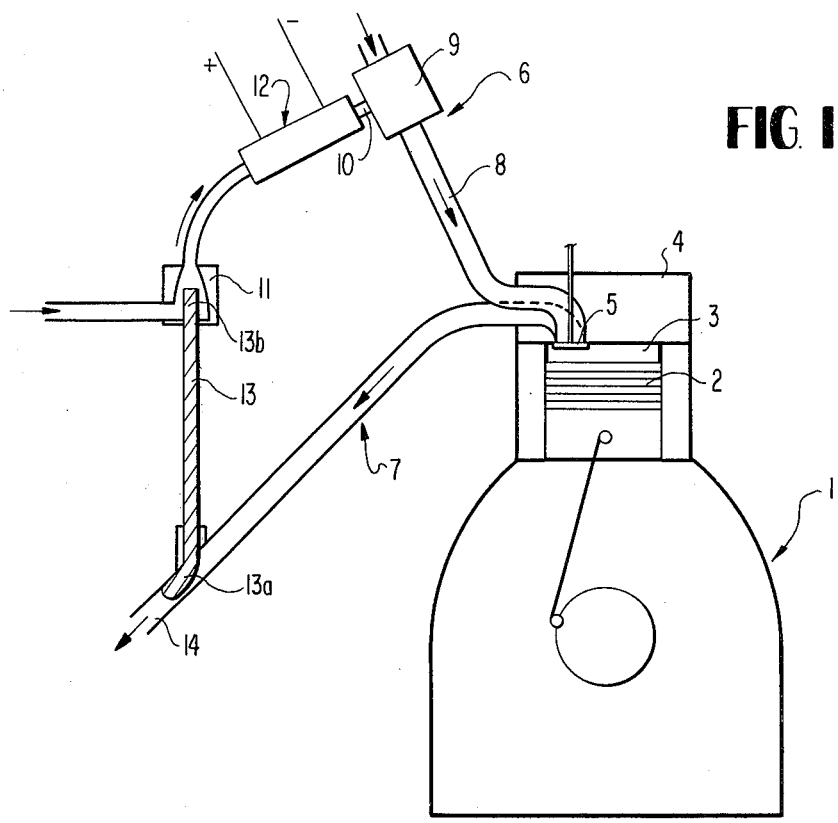
FIG. 1 is a schematic view of an otto reciprocating piston internal combustion engine with heating-up and evaporation of the fuel to be supplied in accordance with the present invention.

Referring now to the drawings wherein like reference numerals are used throughout the various views to designate like parts, and more particularly to FIG. 1, reference numeral 1 generally designates in this figure an Otto reciprocating piston internal combustion engine which includes a variable-volume combustion space 3 above the piston 2, which is connected by way of control elements provided in the cylinder head 4 and formed in this case by valves 5, with a fresh gas supply system generally designated by reference numeral 6 and with an exhaust gas system generally designated by reference numeral 7.

The fresh gas supply system 6 includes a suction pipe 8, to which is coordinated a chamber 9, in which the sucked-in air is enriched with the fuel fed in vapor form by way of the expansion nozzle 10. The fuel is fed to the expansion nozzle 10 with a temperature—to be referred to hereinafter as desired or intended heat-up temperature—which lies near the decomposition temperature of the fuel and to which the fuel which is supplied by way of a high pressure metering installation of conventional type and therefore not illustrated in detail is heated in a heat-exchanger 11 heated by means of exhaust gases and in an electrical heating installation 12 connected downstream of the heat-exchanger 11. The heating to a base temperature lying below the desired or intended heat-up temperature thereby takes place in the heat-exchanger 11, and the temperature difference between the base temperature and the desired or intended heat-up temperature is bridged by electrical booster heating by means of the heating installation 12.

The exhaust gas heat is fed to the exhaust gas heat-exchanger 11 by way of a heat pipe 13 whose evaporator portion 13a projects as a component of an exhaust gas heat-exchanger into the exhaust pipe 14 of the exhaust system 7 and whose condenser portion 13b is coordinated to the fuel heat-exchanger 11.

Figure 2:
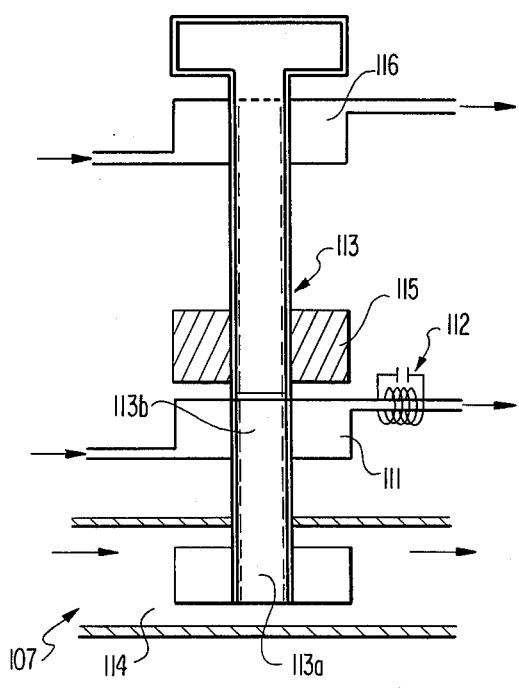
FIG. 2 is a schematic view, partly in cross section, of a first embodiment of a heat-up installation in accordance with the present invention for the fuel to be fed.

A construction is illustrated schematically in FIG. 2 in which the heat pipe generally designated by reference numeral 113 for the limitation of the heat quantity transferred in the fuel heat-exchanger 111 onto the fuel is partially filled with a gas not participating in the heat transport, namely with an inert gas. The filling is so selected that up to the temperature corresponding to the fuel base temperature which is to be attained by heating-up by means of exhaust gases, essentially only that section of the condenser portion 113b of the heat pipe 113 is released by the inert gas for the condensation of the heat carrier, which is coordinated to the fuel heat-exchanger 111. Accordingly, the latent heat storage device 115 of conventional construction which is additionally coordinated to the condenser portion of the heat-exchanger following the fuel heat-exchanger 111, as well as the cooling water heat-exchanger 116 following the latent heat storage device 115 are effectively disconnected from the heat supply by way of the inert gas filling of the heat pipe for such length of time, until a heat quantity is produced in the exhaust gas heat-exchanger 111 which would lead to a heating of the fuel above the base temperature. The temperature rise conditioned thereby leads to a forcing back of the inert gas and to a release or opening up of the latent heat storage device 115 and thereafter additionally of the cooling water heat-exchanger 116 so that fuel overheatings are avoided.

The heat quantity stored in the latent heat storage device 115 enables at the same time a certain comparative moderation in the heat supply out of the exhaust system because, for example, after short operating interruptions and after corresponding slight exhaust gas heat yield during the restarting, the heat quantity stored in the latent heat storage device 115 can be utilized for purposes of heating the fuel in the fuel heat-exchanger 111. The heating of the fuel from the base temperature to the aimed-at desired or intended heated temperature takes place following the fuel heat-exchanger 111 by way of the electric heating device 112 of conventional construction and therefore indicated herein only schematically.

Figure 3:
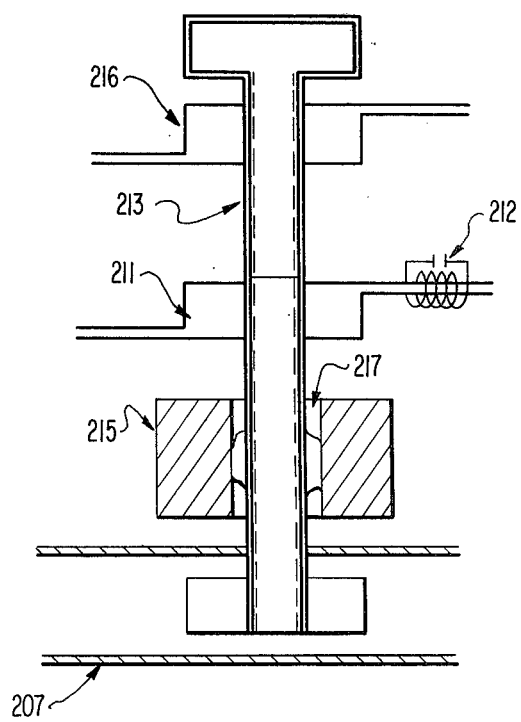
FIG. 3 is a schematic view, partly in cross section, through a second embodiment of a heat-up installation in accordance with the present invention for the fuel to be fed.

FIG. 3 also illustrates a construction in which in addition to the fuel heat-exchanger 211, a latent heat storage device 215 as well as a cooling water heat-exchanger 216 are coordinated to the heat pipe generally designated by reference numeral 213. The latent heat storage device 215 is thereby adapted to be selectively connected or disconnected by way of a thermal switch 217 which may be constructed, for example, according to FIG. 5. With this arrangement, the latent heat storage device 215 is arranged between the exhaust system 207, from which the heat is removed, and the fuel heat-exchanger 211. The cooling water heat-exchanger 216 follows the fuel heat-exchanger 211 along the condenser portion of the heat pipe 213 which cooling water heat-exchanger, as explained by reference to the embodiment according to FIG. 2, is adapted to be selectively connected by way of an inert gas filling of the heat pipe.

In an embodiment according to FIG. 3, in case the produced exhaust gas heat is excessive, at first the latent heat storage device is additionally connected into the system and thereby absorbs a part of the produced heat. It this proportion is too small in order to prevent a further rise of the vapor temperature in the heat pipe, then the inert gas is forced back corresponding to the increasing vapor pressure and as a result thereof, the cooling water heat-exchanger 216 is additionally connected into the system.

Figure 4:
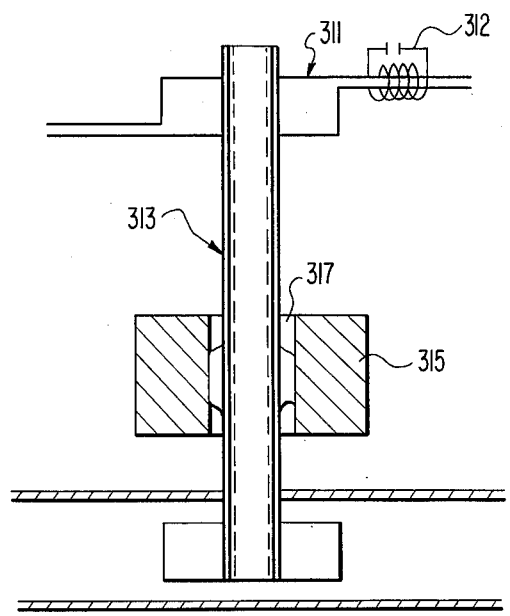
FIG. 4 is a schematic view, partly in cross section, through a third embodiment of a heat-up installation in accordance with the present invention for the fuel to be fed.

In the embodiment according to FIG. 4, an arrangement is shown, in which following the exhaust system, at first a latent heat storage device 315 which is adapted to be selectively connected by way of a thermal switch 317 and thereafter only the fuel heat-exchanger 311 are coordinated to the heat pipe 313, and more particularly, as described above along the condenser portion of the heat pipe. The latter thereby has such a slight filling, not illustrated in detail herein, that the entire filling evaporates when exceeding the base temperature to be attained in the fuel heat-exchanger 311. However, a "drying out" of the heat pipe and therewith a termination of the heat conveyance is connected with the evaporation. The heating-up from the base temperature following the fuel heat-exchanger 311 takes place also in this embodiment by way of an electric heating device 312.

Figure 5:
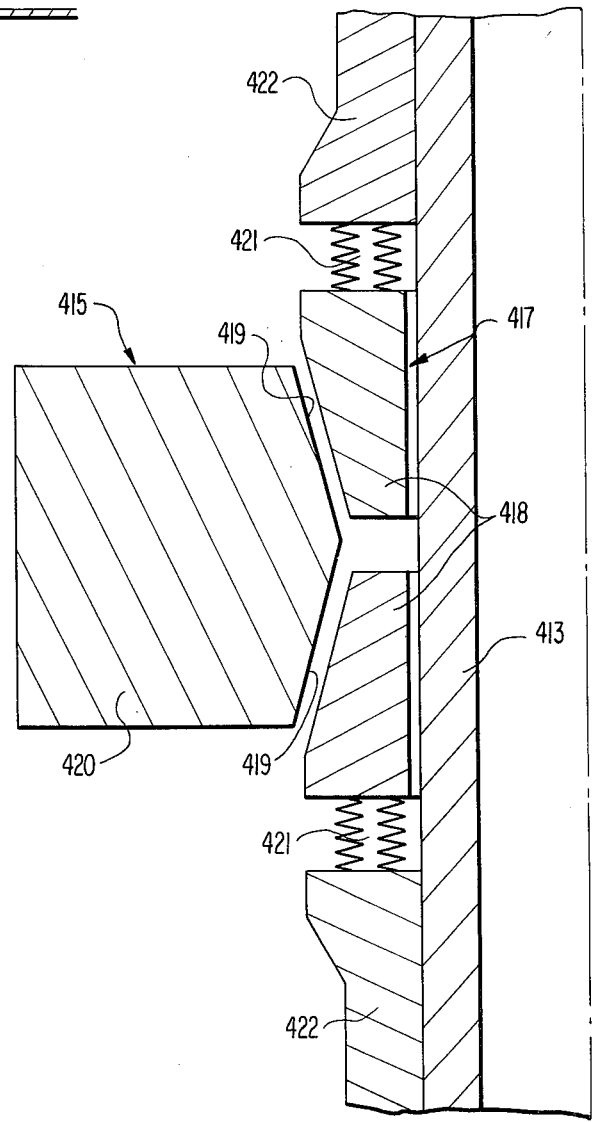
FIG. 5 is a schematic view of an embodiment of a thermal switch element in accordance with the present invention.

A thermal switch can be seen from the embodiment according to FIG. 5 for purposes of connecting or disconnecting the latent heat storage device generally designated by reference numeral 415. The thermal switch generally designated by reference numeral 417 includes two wedge-like contact elements 418 which surround the heat pipe 413 ring-shaped on the outside thereof and which are displaceable with respect to one another whereby they come into contact with corresponding beveled-off or inclined abutment surfaces 419 of the storage core 420. The connection and disconnection takes place in the illustrated embodiment by way of elements 421 of expansible or extensible material of conventional type which are arranged expansible or extensible in the longitudinal direction of the heat pipe 413 between the contact elements 418 and respective support elements or support rings 422. In lieu of expansion material elements, of course, also bimetallic springs or the like may be used.

While we have shown and desribed several embodiments in accordance with the present invention, it is understood that the same is not limited thereto but is susceptible of numerous changes and modifications as known to those skilled in the art, and we therefore do not wish to be limited to the details as shown and described herein but intend to cover all such changes and modifications as are encompassed by the scope of the appended claims.

We claim:

1. An Otto internal combustion engine with high-pressure metering means and evaporation of the heated fuel by way of at least one expansion nozzle means, characterized in that the fuel during the operating phase of the engine is heated by a first means using exhaust gas heat at most to a base temperature lying below its desired temperature and is electrically heated from the base temperature to the desired temperature by a second means, the first means includes heat pipe means having a heat carrier for transferring the exhaust gas heat to the fuel, said heat carrier having a boiling temperature essentially corresponding to the base temperature, and in that a latent heat storage means is coordinated to the heat pipe means in its condenser portion for absorbing excess heat from the exhaust gas so that the fuel is not overheated, and for emitting excess heat to the fuel when insufficient heat is available from the exhaust gas, so that the fuel is heated to the desired temperature.

2. An Otto internal combustion engine according to claim 1, characterized in that a cooling water heat-exchanger means is coordinated to the heat pipe means in its condenser portion.

3. An Otto internal combustion engine according to claim 2, characterized in that at least one of the latent heat storage means and of the cooling water heat-exchanger means is operable to be selectively connected.

4. An Otto internal combustion engine according to claim 3, characterized in that the heat pipe means has a partial inert-gas filling and in that the size of the effective condenser area of the heat pipe means is controlled dependent on temperature by way of the change in volume of the partial inert-gas filling.

5. An Otto internal combustion engine according to claim 4, characterized in that the cooling water heat-exchanger means is operable to be selectively connected in dependence on temperature.

6. An Otto internal combustion engine according to claim 5, characterized in that the latent heat storage means is adapted to be selectively connected in dependence on temperature.

7. An Otto internal combustion engine according to claim 6, characterized in that the latent heat storage means is adapted to be selectively connected by way of a thermal switch means.

8. An Otto internal combustion engine with high-pressure metering means and evaporation of the heated fuel by way of at least one expansion nozzle means, characterized in that the fuel during the operating phase of the engine is heated by a first means using exhaust gas at most to a base temperature lying below its desired temperature and is electrically heated from the base temperature to the desired temperature by a second means, the first means includes a heat pipe means having a heat carrier for transferring the exhaust gas heat to the fuel, said heat carrier having a boiling temperature essentially corresponding to the base temperature, a latent heat storage means is coordinated to the heat pipe means in a condenser portion, a cooling water heat-exchanger means is coordinated to the heat pipe means in its condenser portion, at least one of the latent heat storage means and of the cooling water heat-exchanger means is operable to be selectively connected, the heat pipe means has a partial inert-gas filling and in that the size of the effective condenser area of the heat pipe means is controlled dependent on temperature by way of the change in volume of the partial inert-gas filling, the cooling water heat-exchanger means is operable to be selectively connected in dependence on temperature, the latent heat storage means is adapted to be selectively connected in dependence on temperature, the latent heat storage means is adapted to be selectively connected by way of a thermal switch means, and in that the first means includes a fuel heat-exchanger means and an exhaust gas heat-exchanger means, and in that the latent heat storage means which is operable to be connected by way of a thermal switch means is arranged between the fuel heat-exchanger means and the exhaust gas heat-exchanger means.

9. An Otto internal combustion engine according to claim 8, characterized in that the second means includes a cold conductor means for the electrical heating of the fuel which is constructed as heat-exchanger and whose rated temperature corresponds approximately to the desired temperature.

10. An Otto internal combustion engine according to claim 9, characterized in that the cold conductor means is constructed as porous matrix.

11. An Otto internal combustion engine according to claim 10, characterized in that the cold conductor means consists of stacked plates of densely sintered cold conductor material.

12. An Otto internal combustion engine with high pressure metering means and evaporation of the heated fuel by way of at least one expansion nozzle means, characterized in that the fuel during the operating phase of the engine is heated by a first means using exhaust gas heat at most to a base temperature lying below its desired heated temperature and is operable to be electrically heated from the base temperature to the desired temperature by a second means further characterized in that there is provided a latent heat storage means, (is) coordinated to the first means, for absorbing excess heat from the exhaust gas so that the fuel is not overheated, and for emitting excess heat to the fuel when insufficient heat is available from the exhaust gas so that the fuel is heated to the desired base temperature.

13. An Otto internal combustion engine according to claim 12, characterized in that a cooling water heat-exchanger means is coordinated to the first means.

14. An Otto internal combustion engine according to claim 13, characterized in that at least one of the latent heat-storage means and of the cooling water heat-exchanger means is operable to be selectively connected.

15. An Otto internal combustion engine according to claim 12, characterized in that the latent heat storage means is adapted to be selectively connected in dependence on temperature.

16. An Otto internal combustion engine according to claim 13, characterized in that the cooling water heat-exchanger means is operable to be selectively connected in dependence on temperature.

17. An Otto internal combustion engine according to claim 12, characterized in that the latent heat storage means is adapted to be selectively connected by way of a thermal switch means.

18. An Otto internal combustion engine with high-pressure metering means and evaporation of the heated fuel by way of at least one expansion nozzle means, characterized in that the fuel during the operating phase of the engine is heated by a first means using exhaust gas heat at most to a base temperature lying below its desired temperature and is electrically heated from the base temperature to the desired temperature by a second means, a latent heat storage means is coordinated to the first means, and in that the first means includes a fuel heat-exchanger means and an exhaust gas heat-exchanger means, and in that the latent heat storage means which is operable to be connected by way of a thermal switch means is arranged between the fuel heat-exchanger means and the exhaust gas heat-exchanger means.

19. An Otto internal combustion engine with high-pressure metering means and evaporation of the heated fuel by way of at least one expansion nozzle means, characterized in that the fuel during the operating phase of the engine is heated by a first means using exhaust gas heat at most to a base temperature lying below its desired temperature and is electrically heated from the base temperature to the desired temperature by a second means, the second means includes a cold conductor means for the electrical heating of the fuel which is constructed as heat-exchanger and whose rated temperature corresponds approximately to the desired temperature, the cold conductor means is constructed as porous matrix, and in that the cold conductor means consists of stacked plates of densely sintered cold conductor material.

20. An Otto internal combustion engine with high-pressure metering means and evaporation of the heated fuel by way of at least one expansion nozzle means, characterized in that the fuel during the operating phase of the engine is heated by a first means using exhaust gas heat at most to a base temperature lying below its desired heated temperature and is operable to be electrically heated from the base temperature to the desired temperature by a second means, also characterized in that the second means includes a cold conductor means for the electrical heating of the fuel which is constructed as heat-exchanger and whose rated temperature corresponds approximately to the desired temperature, and further characterized in that the cold conductor means is constructure as porous matrix and in that there is provided a latent heat storage means, coordinated to the first means, for absorbing excess heat from the exhaust gas, so that the fuel is not overheated, and for emitting excess heat to the fuel when insufficient heat is available from the exhaust gas, so that the fuel is heated to the desired base temperature.

* * * * *